(12) United States Patent
Baca et al.

(10) Patent No.: US 7,868,476 B2
(45) Date of Patent: Jan. 11, 2011

(54) WIND-DRIVEN ELECTRIC POWER GENERATION SYSTEM

(75) Inventors: Anthony Michael Baca, Albuquerque, NM (US); Donald Wichers, Albuquerque, NM (US); Luis M. Ortiz, Albuquerque, NM (US)

(73) Assignee: MDL Enterprises, LLC, Albuquerque, NM (US)

( * ) Notice: Subject to any disclaimer, the term of this patent is extended or adjusted under 35 U.S.C. 154(b) by 480 days.

(21) Appl. No.: 12/058,764

(22) Filed: Mar. 31, 2008

(65) Prior Publication Data

US 2008/0272603 A1  Nov. 6, 2008

Related U.S. Application Data

(60) Provisional application No. 60/921,331, filed on Mar. 31, 2007, provisional application No. 60/953,106, filed on Jul. 31, 2007.

(51) Int. Cl.
*F03D 9/00* (2006.01)
(52) U.S. Cl. .......................................... 290/55; 415/4.5
(58) Field of Classification Search ................... 290/43, 290/44, 54, 55; 415/4.5, 4.3
See application file for complete search history.

(56) References Cited

U.S. PATENT DOCUMENTS

| | | | | |
|---|---|---|---|---|
| 4,021,135 A | * | 5/1977 | Pedersen et al. | 415/208.2 |
| 4,204,799 A | * | 5/1980 | de Geus | 415/4.5 |
| 4,600,360 A | * | 7/1986 | Quarterman | 415/148 |
| 6,382,904 B1 | * | 5/2002 | Orlov et al. | 415/4.5 |
| 7,683,501 B2 | * | 3/2010 | Berenda et al. | 290/55 |
| 2008/0238105 A1 | * | 10/2008 | Ortiz et al. | 290/54 |
| 2009/0180869 A1 | * | 7/2009 | Brock | 415/208.2 |
| 2010/0230973 A1 | * | 9/2010 | Ortiz et al. | 290/55 |

* cited by examiner

*Primary Examiner*—Nicholas Ponomarenko
(74) *Attorney, Agent, or Firm*—Ortiz & Lopez (57) ABSTRACT

A system generating electrical power from wind includes a cowling to capture wind and directs it into a tubular housing. At least one fixed helical vane can be integrated into the inner surfaces of the tubular housing in a spiral, adapted to further direct the captured wind into a spiraled air flow and focus the wind directly onto electrical generator fan blades located near an exhaust of the system. A generator cone can be mounted at the front of the generator or fan blades facing air passing through the tubular housing. As air passes over the generator cone it can experience compression between the generator cone and housing resulting in increased pressure and velocity of the air, thereby increasing rotational speed of the generator blades and generator as the compressed air passes through the blades and exits the system's exhaust. The system can be used for fixed or mobile applications.

20 Claims, 10 Drawing Sheets

WIND-DRIVEN ELECTRIC POWER GENERATION SYSTEM

CONTINUATION AND PRIORITY DATA

Priority is claimed to provisional patent application 60/921,331, filed Mar. 31, 2007, and also to provisional patent application 60/953,106, filed Jul. 31, 2007, both herein incorporated by reference.

TECHNICAL FIELD

The present invention is generally related to renewable energy systems. More particularly, the present invention is related to wind power generator systems adapted for fixed and mobile electrical power generation systems and applications.

BACKGROUND OF THE INVENTION

Wind is a force of nature that is all around us. It is harnessed to sail ships, pump water, and create electricity, just to name a few. Recent events in the world have highlighted the need for alternative methods of power production, whether it is from the wind, the sun, water, or organic matter. Changes in battery storage capacity and life and generator efficiency have made it so that individuals desiring to supplement their energy requirements may do so at a much more affordable cost over 15 years ago.

In general, electric power generation systems can be classified into hydroelectric power generation, thermal power generation, nuclear power generation, solar power generation, biofuel power generation and wind power generation using wind energy. Wind energy is limitless, purely domestic renewable energy that is freely available in the world. The wind power generation system faces some difficulty in its stability due to fluctuation in direction and speed of air. Wind energy has been used as a source of power for sailing ships for several thousands of years, and until recently, we have been using it in water pumping and operating flour mills. Recently, many new ideas and theories for windmill and wind power generation have surfaced, like propeller shaped blades as part of large, scaled power generators that rotate based on aerodynamics of the blade designs.

Wind generated power has been used as a source of electricity that can be used directly by buildings and other fixed infrastructure, or has been fed directly into public utility system grids for distribution and use by public utility customers. Wind generated electrical power will continue to find uses as its need increases at all levels and types of consumption and as an alternative energy to fossil fuels.

It is known in the art that the propeller of a wind power generator should ideally be positioned in the path of the flowing air. In most systems currently being deployed internationally, propellers and generators can reach height greater than 100 feet and rotational diameters greater than 50 ft. Propellers currently used with wind power generators are designed in such a way to produce power output as various wind speed conditions press against propeller blades.

Systems are needed that are smaller than is currently is wide use, and can remain effective as electrical power generators at various wind speeds. There is also more specifically a need for smaller, less visually intrusive systems for fixed residential, commercial and mobile applications. With the current invention a system is presented that can less expensively generate electrical energy from wind. Power generated by the present invention can be utilized in fixed as well as mobile applications.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore an objective of the present invention to provide an improved wind power electrical generating system.

It is another objective of the present invention to provide a wind driven electric power generator system useful for static and mobile applications.

In accordance with a feature of the present invention, a system generating electrical power from wind includes a cowling located at a first end of a tubular housing to capture wind and directs it into the tubular housing.

In accordance with another feature of the present invention, at least one fixed helical vane can be integrated into the inner surfaces of the tubular housing in a spiral, adapted to further direct the captured wind into a spiraled air flow and focus the wind directly onto fan blades connected to an electrical generator located near a second end of the tubular housing where air is exhausted from the tubular housing.

In accordance with another feature of the present invention, a conical flange can be formed at the second end of the unit, said conical flange adapted to protect the can blades and also enables air to escape from the unit without interruption from exterior wind source moving along the sides of the unit.

In accordance with another feature of the present invention, a cone can be mounted at the front of the generator or fan blades facing air passing through the tubular housing. As air passes over the generator cone it can experience compression between the generator cone and housing resulting in increased pressure and velocity of the air, thereby increasing rotational speed of the generator blades and generator as the compressed air passes through the blades and exits the system's exhaust.

In accordance with another feature of the present invention, the system can be rotatably mounted on top of a pole for fixed residential or commercial applications. Mounting of the unit to poles, rooftops, beams and other fixed hardware can be facilitated with bearing and mounts that can withstand extreme fluctuations and high stress.

In accordance with another feature of the present invention, electrical contact discs (plates) can be provided that facilitate electrical connections between the generator and external modules (e.g., batteries, converters, etc.) and prevent wire tangling. Sealed electrical contact discs can be integrated with the bearing and mounting mechanism adapted to rotatably mount the housing to a pole.

In accordance with another feature of the present invention, a fin can be provided in fixed attachment to a second end of the power generating system near the second end of the tubular housing to direct the front of the tubular housing into approaching wind by rotating the housing on a pole, thereby enabling the system to receive the maximum amount of available wind into the system.

In accordance with another feature of the present invention, the system can be integrated near the front of a moving vehicle to capture air as the vehicle moves forward, thereby generating electrical power from air for a load, such as hybrid vehicle batteries.

In accordance with another feature of the present invention, generated electrical power can be routed via electrical connections from the generator for direct storage in and then for later use from storage batteries.

In accordance with another feature of the present invention, power conditioning can be provided to generated power if necessary using conditioning circuits known in the art (e.g., filtering circuits). The size of the present system is scalable to meet delivery requirements.

In accordance with another feature of the present invention, the housing can be made of a tough light weight metal or a composite that will be able to withstand harsh environments while meeting the highest of standards.

In accordance with another feature of the present invention, a cone can be located at the front of the generator/fan with its point facing facing incoming air/wind to cause the wind/air to flow directly onto fan blades and not encounter a flat surface typically associated with the back of a generator or center portion of a fan wherefrom blades extend. Pressure caused between the inner surface of the housing tubing and the cone/generator can force air directly onto the generator fan blades and outward past the fan blades where the air can be exhausted from the second end of the housing.

In accordance with another feature of the present invention, a cupped fan blade can be included to enhance the effect of air pressure on the fan blades and ultimately as rotation of the generator.

In accordance with another feature of the present invention, a clutching mechanism and/or mechanical breakaway can be provided to accommodate conditions where the wind speed exceeds rotational capabilities of the generator and/or power output requirements/thresholds. Clutching can be provided in the form of a fan blade assembly designed with materials that can flex above threshold rotational speeds (RPMs) in order to prevent operation of the generator above damage causing thresholds, design parameters and generator capacity limits.

In accordance with another feature of the present invention, an electronic starting circuit can be provided in order to facilitate initial starting of the generator from periods when the generator is idle (e.g., no rotation due to lack of wind). The electronic starting system can provide an initial release of electrical energy to the windings in the generator to thereby reduce the amount of wind required to spin-up or start rotation of the generator.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
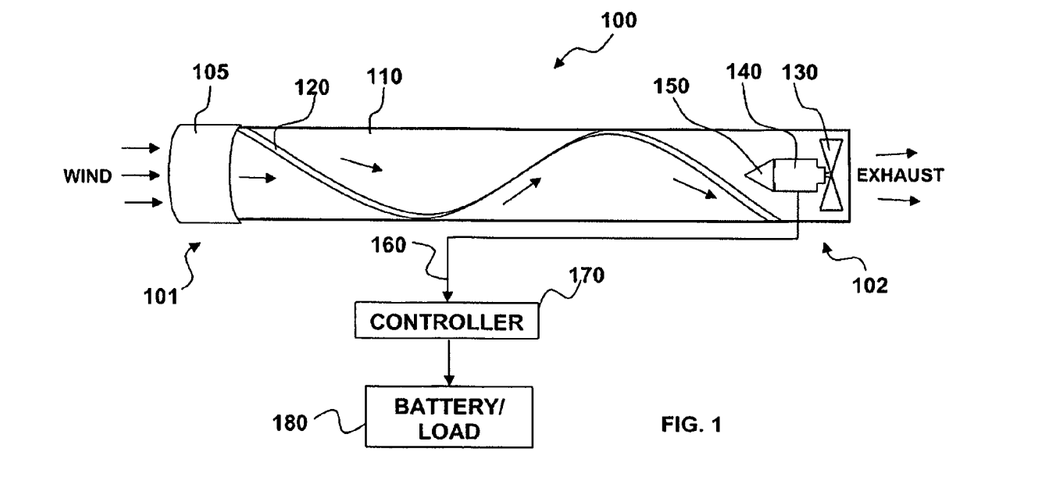
FIG. 1 illustrates a block diagram of a wind driven electrical power generating system, which can be implemented in accordance with features of the present invention.

FIG. 1 illustrates a block diagram of a wind driven electrical power generating system 100, which can be implemented in accordance with a preferred embodiment. The system 100 has a cowling 105 to captured wind within a tubular housing 110 including at least one helical vane 120 formed therein which will rotate cause wind flowing as air through the tubular housing to spin as it approaches a fan 130 including fan blades mechanically connected to an electric generator 140 wherein electrical power can be generated as the fan 130 turns the electric generator 140. A generator cone 150 can be provided in front of the electrical generator 140, if the generator can be placed before the fan 130, or before the flat center portion of the fan (not shown), which supports fan blades extending there from, if the fan can be placed before the generator. It can be appreciated that the electrical generator 140 and any electrical wiring associated therewith can be protected within the tubular housing 110 when the generator can be placed before the fan. The electrical power from the electrical generator 140 can be routed via electrical connection 160 for immediate use by a load 180 (e.g., storage and later use in/from batteries) or can pass through a controller 170.

An exhaust 210 can be designed at a wider, tapered outward diameter than the air passage tubing 110 in order to allow air flowing through the air passage to easily escape the system around the generator, thus also aiding in the removal of heat produced in/by the generator during the production of electrical power, which can be positioned within the path of flowing air and could otherwise restrict exiting of air and thereby reduce the effectiveness of power generation from the system.

Figure 2:
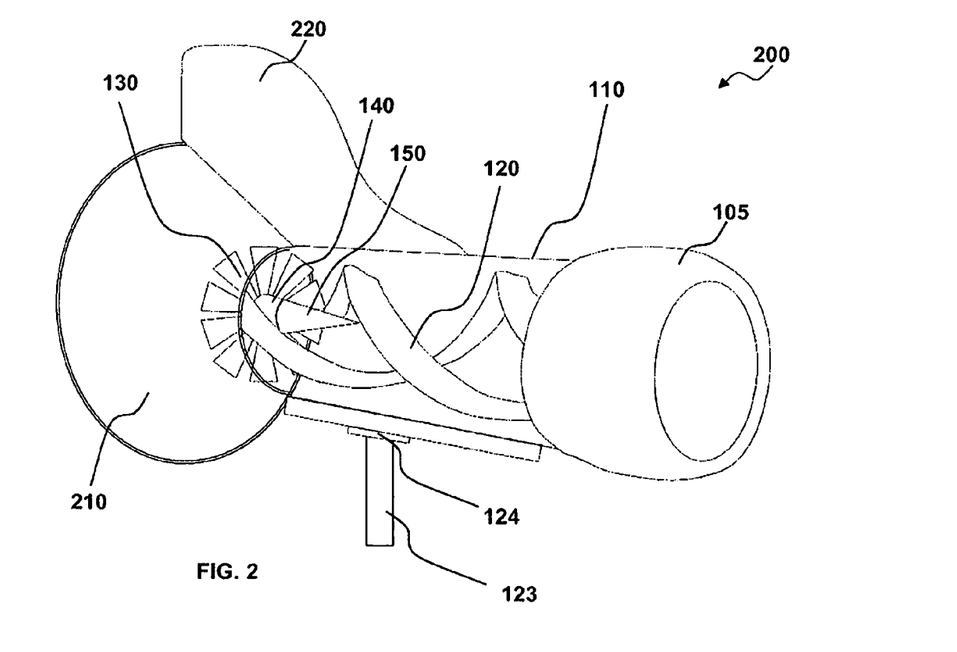
FIG. 2 is an illustration of a wind driven electrical power generating system, which can be implemented in accordance with features of the present invention.

FIG. 2 illustrates a photograph 200 of a wind driven electrical power generating system, which can be implemented in accordance with a preferred embodiment. Note that in FIG. 2, identical or similar parts or elements are generally indicated by identical reference numerals. For example, the cowling intake 105, passage tube 110, exhaust 210, generator 140, generator cone 150, fan 130, at least one fixed helix 120, fin 220, pole 123 and bearing system 124 appears in FIG. 2. The system depicted in FIG. 2 is typical of what can be sued for fixed deployment, e.g., for use with residential and commercial applications.

Figures 3, 4:
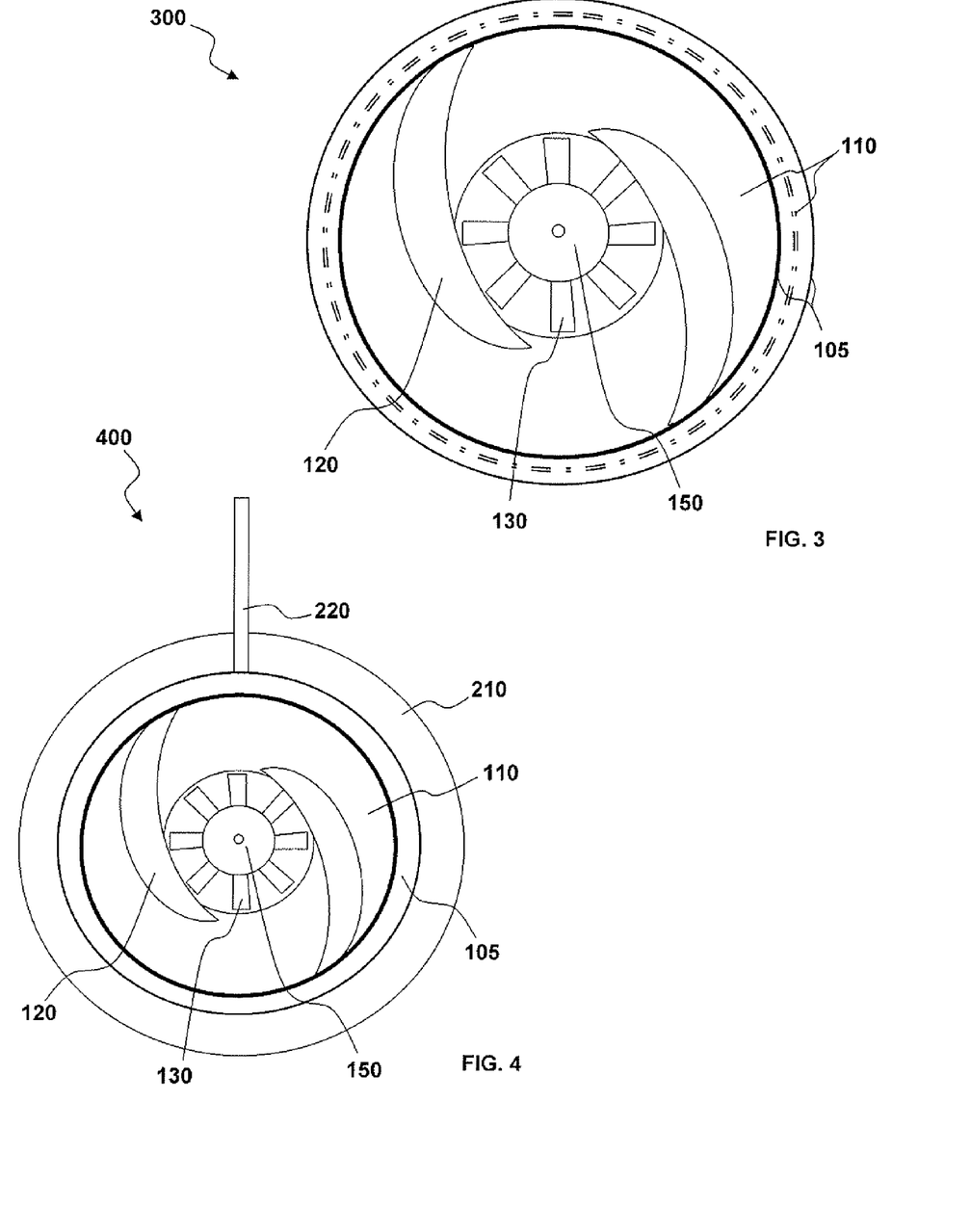
FIG. 3 illustrates a view of the first end of the wind driven electrical power generating system looking into the cowling through the inside of the tubular housing past helical vanes towards the fan, in accordance with features of the present invention.
FIG. 4 illustrates a view of the first end of the wind driven electrical power generating system such as that shown in FIG. 3, including a fin and conical flange located near the second end of the system, in accordance with features of the present invention.

FIG. 3 illustrates a view of the first end 300 of the wind driven electrical power generating system as shown in FIG. 1, looking into the cowling 105 through the inside of the tubular housing 110 past helical vanes 120 towards the fan 130, in accordance with features of the present invention.

FIG. 4 illustrates a view of the first end 400 of the wind driven electrical power generating system such as that shown in FIG. 2, including a fin 220 and conical flange 210 located near the second end of the system, in accordance with features of the present invention.

Fixed helices within a tube 110 as depicted in FIG. 1 increase the air flow as well as creating a spiral laminar air flow, avoiding turbulent air flow, thus spinning specifically designed vanes of a fan blade assembly 130 at an accelerated speed, thereby increasing rotational speed of the generator 140 for optimal power output with minimal velocity or wind speed conditions external to the system. Fixed helical vanes 120 should be designed to achieve the direction of incoming air into a spiraled air flow. Fixed helices 120 within the enclosure tube increase the air flow as well as creating a spiraled air flow, (the cowling creates the laminar flow and the helical vanes 120 create the spiral motion) avoiding turbulent air flow, thus spinning a specifically designed blades of a fan blade 130 assembly at an accelerated speed, thereby increasing rotational speed of the generator 140 for optimal power output with minimal velocity or wind speed conditions external to the system. Based on enclosure shape and design, the helical vanes 120 can conform to a concave inner surface of the tubular housing 110 enclosure inner surface while insuring the optimal three-dimensional helix angles. The vanes 120 can direct and increase the spiral rotation and velocity of the air, thus more efficiently spinning the fan blade 130 thereby increasing rotational efficiency of the generator for optimal power output.

Figure 5:
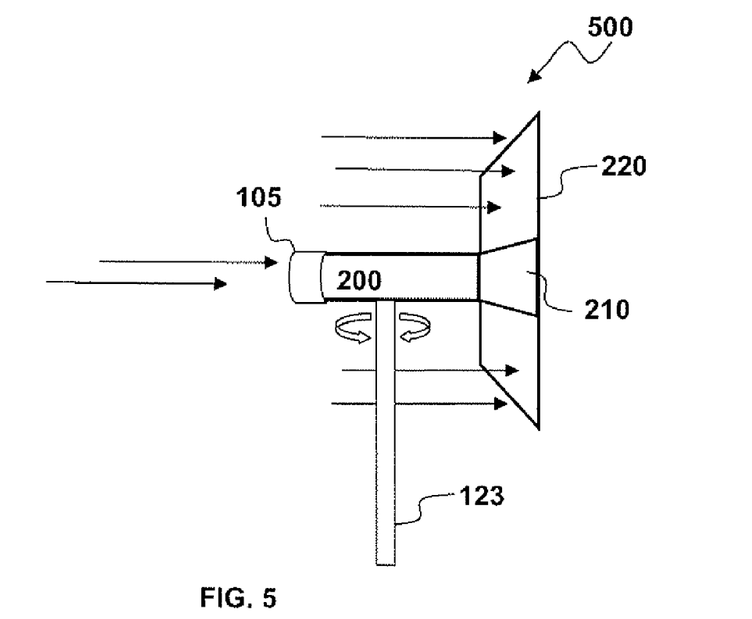
FIG. 5 illustrates a side view of wind driven electrical power generating system including a fin and conical flange located near the second end of the system with wind directing the cowling located at the first end of the tubular housing into oncoming wind, in accordance with features of the present invention.

FIG. 5 illustrates a schematic diagram 500 of a wind driven electrical power generating system 200, which can be deployed for static use in accordance with a preferred embodiment. To receive the maximum amount of wind into the system, the cowling 105 should be properly oriented. This can be achieved by rotatably mounting the system 200 on top of a pole 123 and providing a fin 220 in fixed attachment to the second end (rear end) of the power generating system near the exhaust 210. The fin 220 can be integrated with the exhaust 210 as shown in FIG. 2.

A fin 220 such as that illustrated in FIG. 5 can be assembled near the rear end of the system in order to assist in maintaining orientation of the front end (wind intake) portion of the system and its cowling 105 in the direction of incoming wind. A conical flange 210 formed at the rear of the unit 200 protects the blades and also enables air to escape from the unit without interruption from exterior wind source moving along the sides of the unit. The conical flange 210 also assists in unit orientation along with the fin 220. The fin should be balanced so that half its weight is on either side of its axis, but also designed so that the momentum about the axis of the areas exposed to the wind are unequal. This unequal moment causes the fin to rotate to minimize the force of the wind on its surface. The design of the fin 220 causes the end with the smallest moment to turn into the wind, pointing to the source of the wind. The directional fin can be balanced so that half its weight is on either side of its axis, but also designed so that the momentum about the axis of the areas exposed to the wind are unequal. This unequal moment causes the fin to rotate to minimize the force of the wind on its surface. The design of the fin in this manner can cause the end with the smallest moment to turn into the wind, thereby enabling the unit to more effectively capture the wind.

Figure 6:
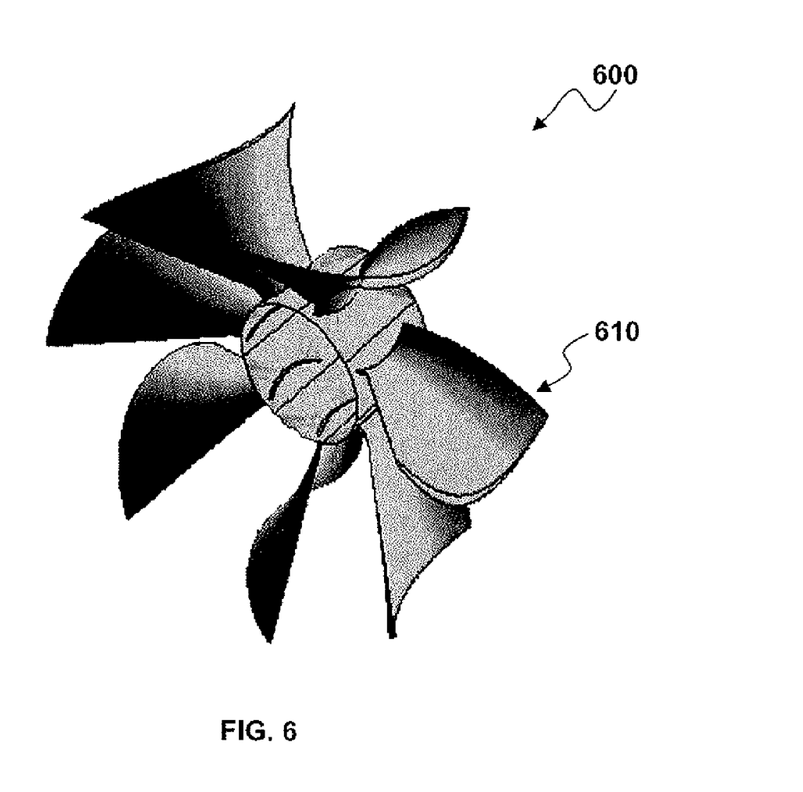
FIG. 6 illustrates a fan with cupped fan blades, in accordance with features of the present invention.

FIG. 6 illustrates a fan blade assembly 600 with cupped fan blades 610, in accordance with features of the present invention. The fan blade assembly 600 can be designed with a cupped fan blade design such that each blade can enhance each blade's ability to capture and be moved by wind passing through and managed by the housing and its helical vanes. It is possible to manufacture the fan blade assembly with materials that will flex above threshold rotational speeds (RPMs) in order to prevent operation of the generator above damage causing thresholds, design parameters and generator capacity limits. But it should also be appreciated that a clutching mechanism or mechanical breakaway can be provided between the fan blade assembly and the electrical generator to accommodate conditions where the wind speed exceeds rotational capabilities of the generator and/or power output requirements/thresholds.

Figure 7:
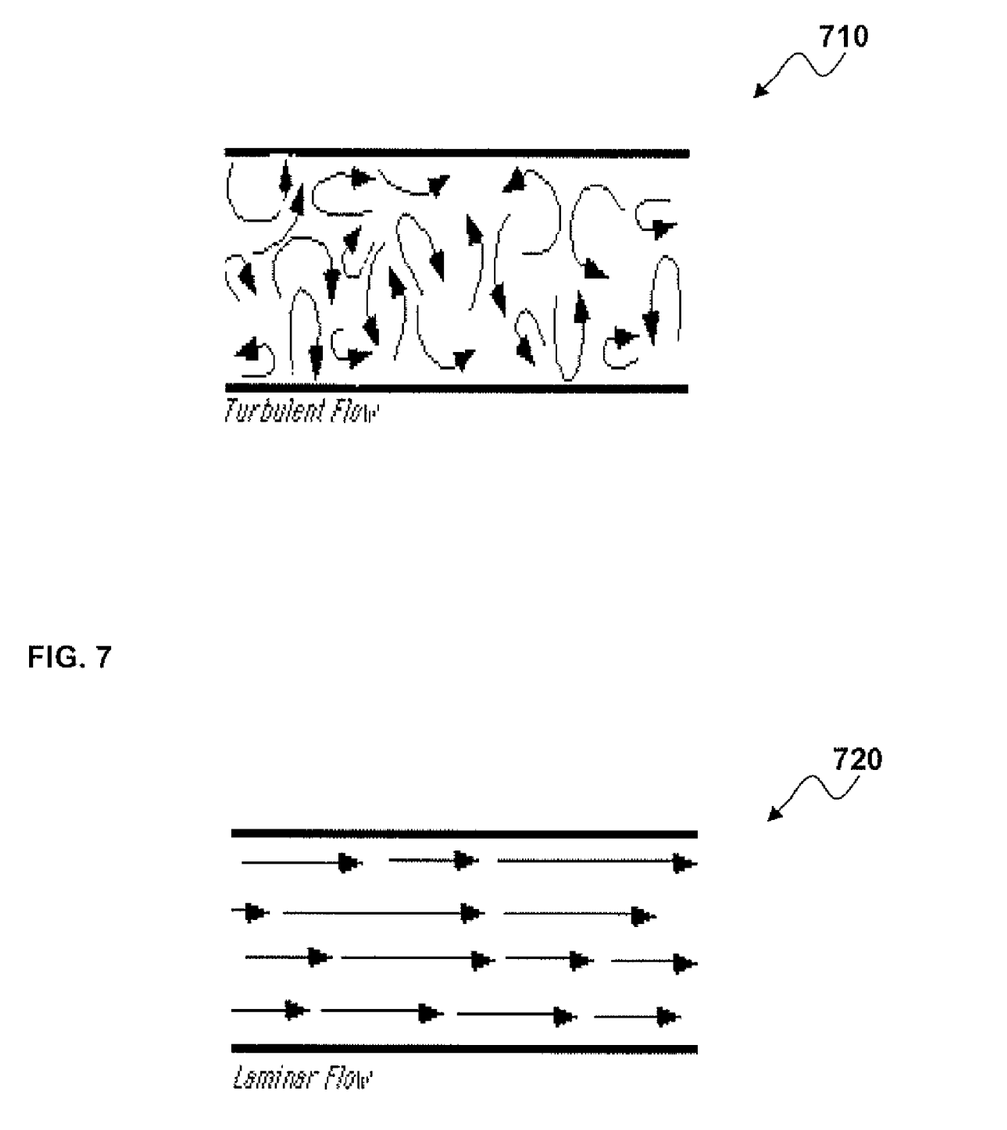
FIG. 7 illustrates a turbulent flow of air flowing through a tubular housing without a cowling, and a laminar flow of air flowing through a tubular housing of wind driven electrical power generating system using a cowling to capture wind and direct it into the housing, which can be implemented in accordance with a preferred embodiment.

FIG. 7 illustrates a turbulent flow 710 of a wind inside passage tube of wind driven electrical power generating system, which can be implemented in accordance with a preferred embodiment. Air flow occurs only when there is a difference between pressures. Air will flow from a region of high pressure to one of low pressure. Bigger the presser difference, faster the flow. Thus air flows in during inspiration because the alveolar pressure is less than the pressure at the mouth; air flows out during expiration because alveolar pressure exceeds the pressure at the mouth such that to double the flow rate one must quadruple the driving pressure. When air flows at higher velocities, especially through an airway with irregular walls, flow is generally disorganized, even chaotic, and tends to form eddies. This is called turbulent flow, and is found mainly in the largest airways, like the trachea.

A relatively large driving pressure is required to sustain turbulent flow. Driving pressure during turbulent flow is in fact proportional to the square of the flow rate such that to double the flow rate one must quadruple the driving pressure.

Turbulent flow can be described by Poiseuille's Law:
$\Delta P = K V^2$
Where $\Delta P$=Driving force,
K=Constant,
V=Air flow.

FIG. 7 also illustrates a laminar flow 720 of a wind inside passage tube of wind driven electrical power generating system, which can be implemented in accordance with a preferred embodiment. When flow is low velocity and through narrow tubes, it tends to be more orderly and streamlined and to flow in a straight line. This type of flow is called laminar flow. Unlike turbulent flow, laminar flow is directly proportional to the driving pressure, such that to double the flow rate, one needs only double the driving pressure.

Laminar flow can be described by Poiseuille's Law $\Delta P = V (8\eta l/\pi r^4)$ Where $\Delta P$=Difference in pressure between two points,
V=Air flow,
R=Radius of passage tube,
$\eta$=Gas Velocity, and
l=length of the tube.

Figure 8:
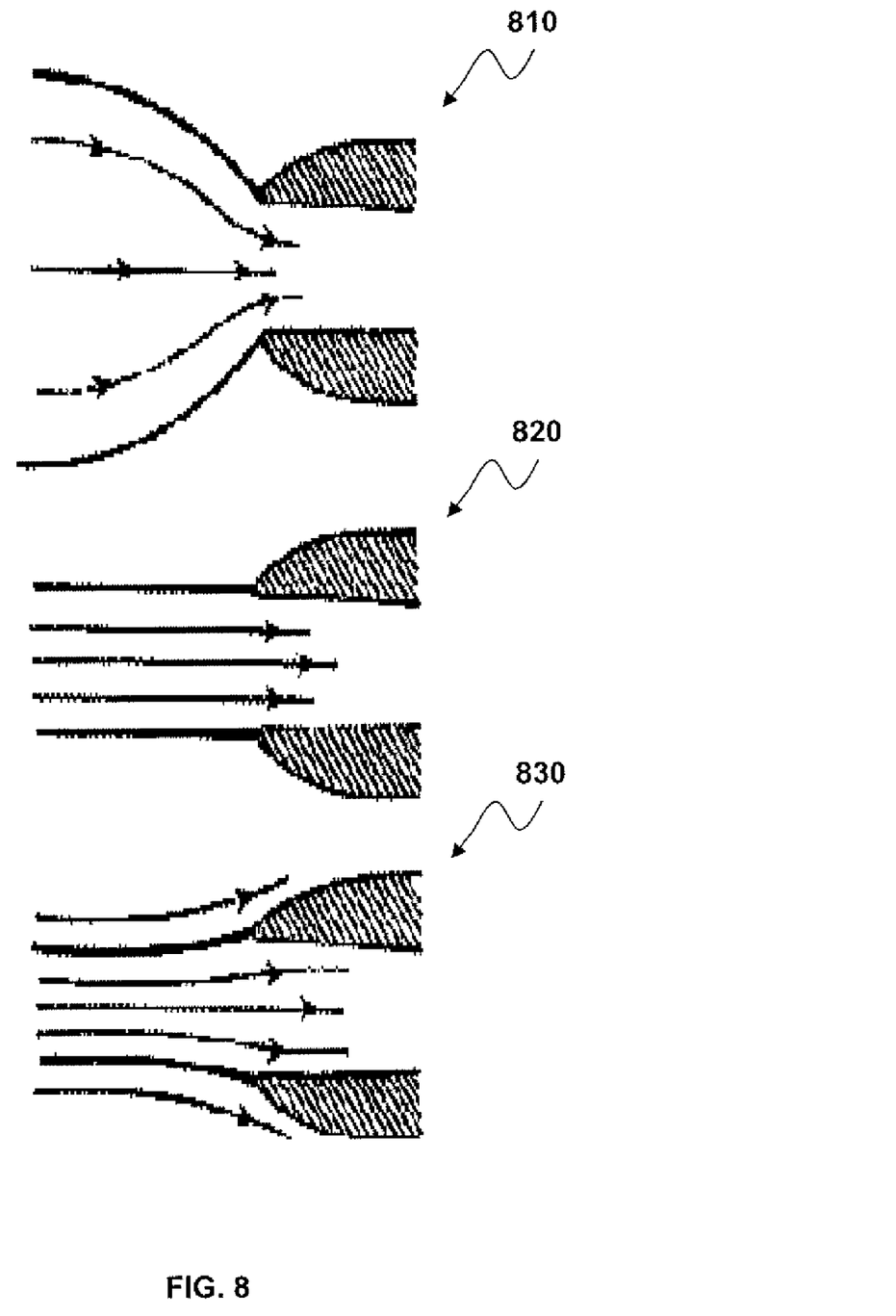
FIG. 8 illustrates three phenomena that can occur with wind directed toward a cowling, a cowling design of a wind driven electrical power generating system, which can be implemented in accordance with a preferred embodiment.

FIG. 8 illustrates a cowling design 810 of a wind driven electrical power generating system, which can be implemented in accordance with a preferred embodiment. The design of the conical inlet (a tube with an aerodynamic fairing around it) or conical air intake helps to direct the amount of air flow into the chamber. A cylindrical intake design 820 of a wind driven electrical power generating system, which can be implemented in accordance with a preferred embodiment. FIG. 830 illustrates a tapered intake design 630 of a wind driven electrical power generating system, which can be implemented in accordance with a preferred embodiment. The inlet is design to draw in as much wind coming toward it as possible to cause favorable power generation by the system 100 as depicted in FIG. 1, especially when used in combination with at least one fixed helical vane 120 as depicted in FIG. 1 and fan blade 130 as depicted in FIG. 6 interaction with air flow through the tubing 110 as depicted in FIG. 1.

Figure 9:
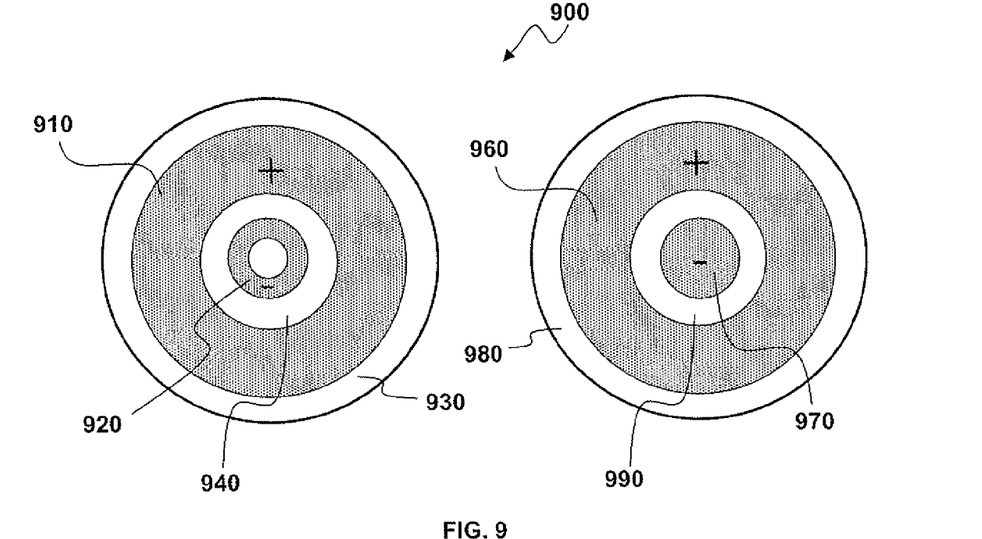
FIG. 9 illustrates surfaces of a electrical contact disc system that can be used in combination with a bearing system to mount a wind generator to a pole and prevent wire tangling, in accordance with features of the present invention.

FIG. 9 illustrates surfaces of an electrical contact disc system 900 that can be used in combination with a bearing system (not shown) to mount a wind generator to a pole and prevent wire tangling, in accordance with features of the present invention. Positive contact surface 910 makes physical contact with positive contact surface 960. Negative contact surface 920 makes contact with negative contact surface 970. Electrical insulator surface 930 makes contact with electrical insulator surface 980. Electrical insulator surface 940 makes contact with electrical insulator surface 990. Negative contact surface 920 also shows a circular void at its middle which can accept an end of a pole (not shown).

Figure 10:
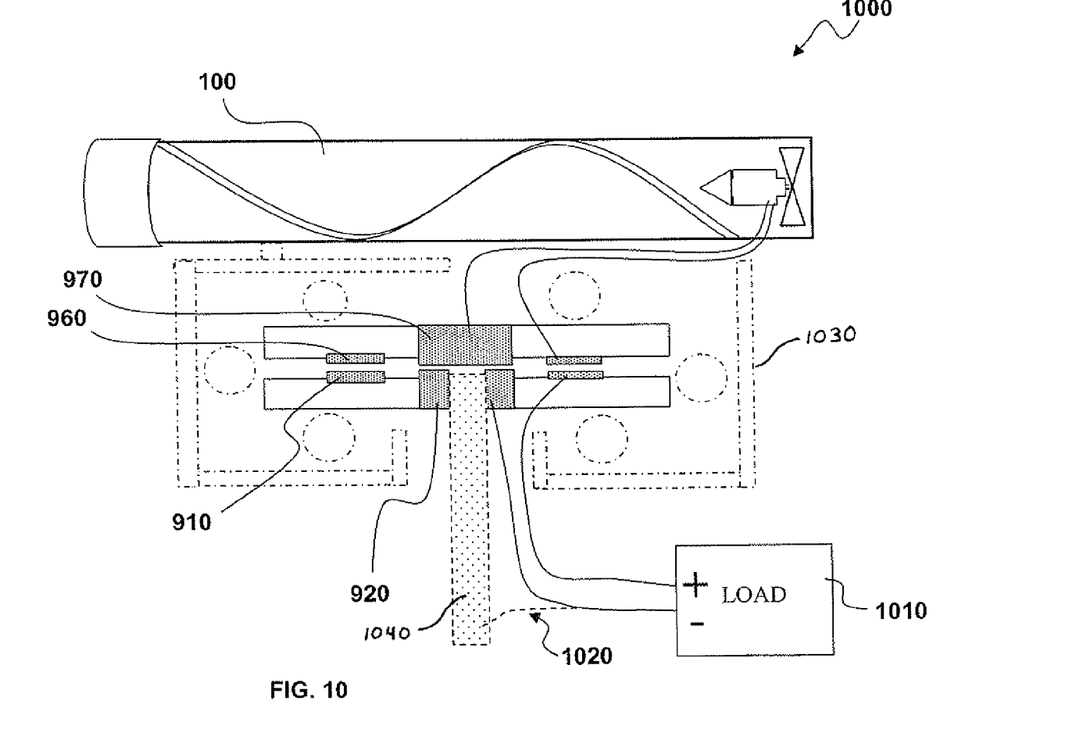
FIG. 10 illustrates the electrical contact disc system shown in FIG. 9 in use with a bearing system to mount a wind power generator to a pole, in accordance with features of the present invention.

FIG. 10 illustrates the electrical contact disc system 900 shown in FIG. 9 in use with a bearing system assembly 1030 to mount a wind power generator 100 to a pole 1040, in accordance with features of the present invention. Once fully assembled the surfaces described would make electrical contact while the generator 100 rotates about the bearing system assembly 1030. Electrical contact discs can facilitated electrical connections between the generator and external modules (e.g., batteries, converters, etc.) and prevent wire tangling. A simple design of sealed electrical contactor plates can enable them to be integrated with the bearing and mounting mechanism.

Figure 11:
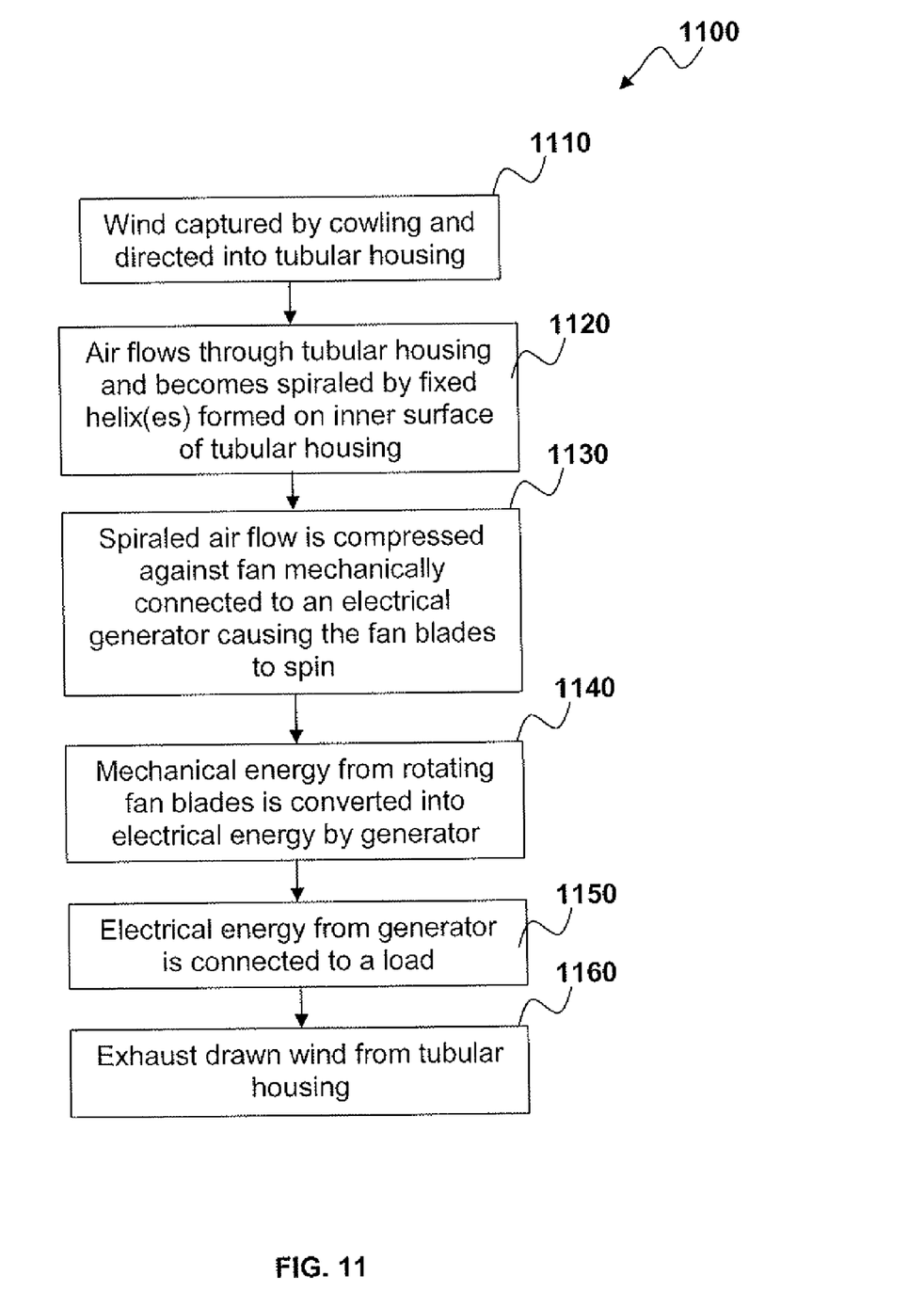
FIG. 11 illustrates a high level flow chart of operations depicting a wind driven electrical power generating method, which can be implemented in accordance with a preferred embodiment.

FIG. 11 illustrates a high level flow chart 1100 of a wind driven electrical power generation method, which can be implemented in accordance with a preferred embodiment. The wind is captured by a cowling and directed into the tubular housing as shown in Block 1110. As depicted at Block 1120, captured wind flows as air through the tubular housing and becomes spiraled by a fixed helix, or helices, formed on the inner surface of the tubular housing. The spiraled air flow is compressed against a fan mechanically connected to an electrical generator causing the fan blades to spin as shown in Block 1130. The mechanical energy from the rotating fan blades is converted into electrical energy by the generator, as shown in Block 1140. The electrical energy from the generator is connected to a load as shown in Block 1150. As shown in Block 1160, the drawn wind (air) is exhausted from the tubular housing.

Figure 12:
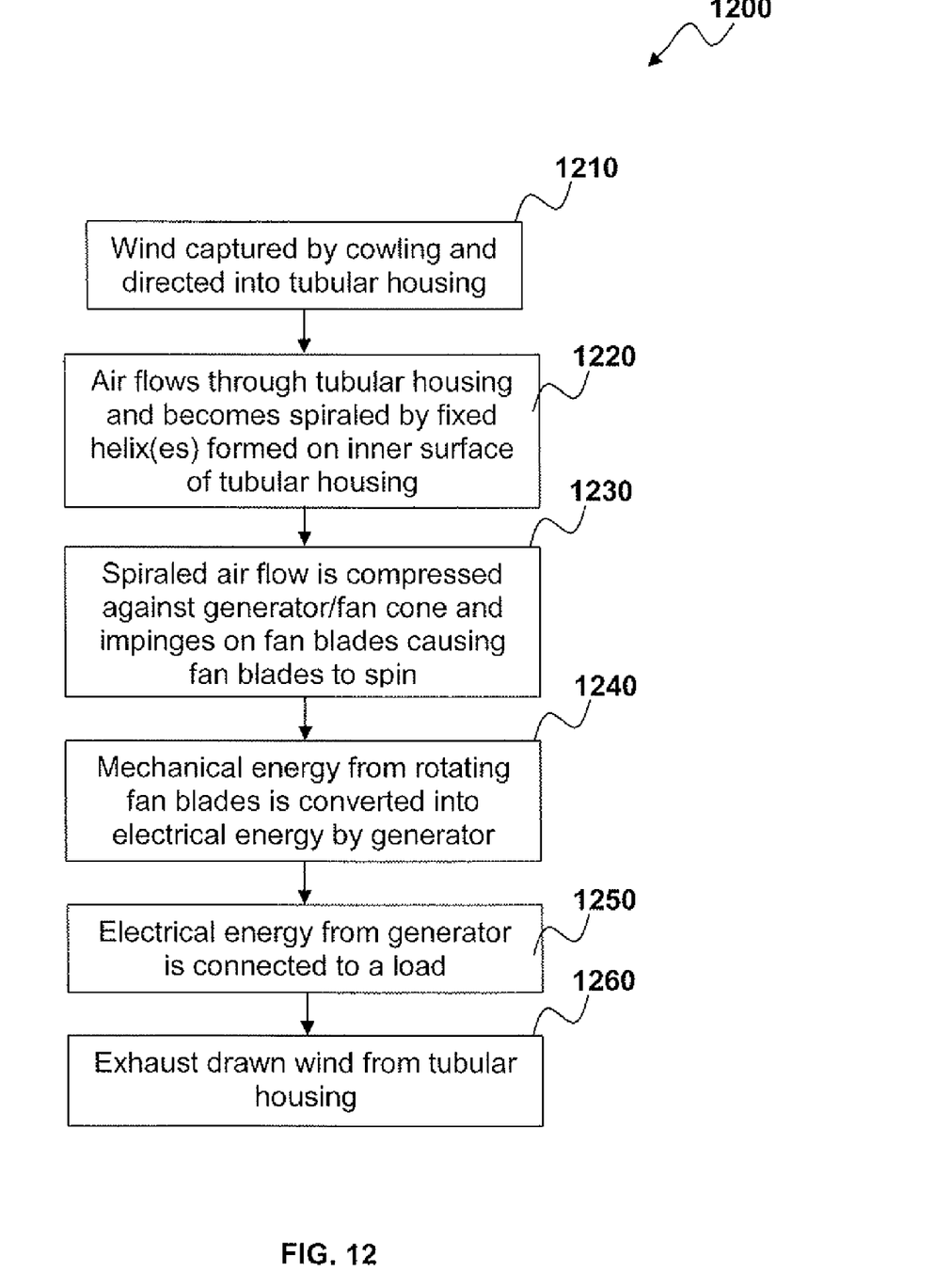
FIG. 12 illustrates a high level flow chart of operations depicting a wind driven electrical power generating method, which can be implemented in accordance with an alternative embodiment.

FIG. 12 illustrates a high level flow chart 1100 of a wind driven electrical power generation method, which can be implemented in accordance with a preferred embodiment. The wind is captured by a cowling and directed into the tubular housing as shown in Block 1210. As depicted at Block 1220, captured wind flows as air through the tubular housing and becomes spiraled by a fixed helix, or helices, formed on the inner surface of the tubular housing. The spiraled air flow is compressed against a generator/fan cone and impinged on fan blades causing the fan blades to spin, as shown in Block 1130. The mechanical energy from the rotating fan blades is converted into electrical energy by a generator, as shown in Block 1140. The electrical energy from the generator is connected to a load as shown in Block 1150. As shown in Block 1160, the drawn wind (air) is exhausted from the tubular housing.

Some manufacturers are proposing use of a small electric motor that is squeezed between the engine and transmission, replacing the conventional alternator and starter motor. While waiting at a stop light, the truck's internal combustion engine shuts off, then turns on and takes off smoothly with a slight assist from the electric motor when the driver needs to accelerate. An added bonus: the system provides 110-volt outlets on board for power tools or other uses. Some refer to this system as a "start-stop" hybrid, General Motors calls it a "parallel" hybrid, and the auto industry says this, too, is a mild hybrid. Vehicles that combine two or more sources of power will typically be referred to as a hybrid vehicle (HV). According to the U.S. Department of Energy, hybrid electric vehicle (HEV) are vehicles that combine an internal combustion engine (ICE) and a battery with an electric motor. Automobile manufacturers such as Toyota®, Honda®) and Ford® sell such vehicles. Newer companies are now proposing all electric motor vehicles, such as that proposed by Tesla Motors of San Carlos, Calif.

Gasoline-electric hybrid systems are very complex in design and operation and include system components such as controllers, generators, converters, inverters and regenerative braking. There are two different types of HEV configurations. One is called a parallel, the other a series configuration. But the auto industry apparently believes that using these terms would confuse consumers, so instead a parallel HEV is being called a "full hybrid" system and a series HEV is a "mild hybrid" system.

A parallel system, such as that found in the Ford Escape® Hybrid SUV and Toyota Prius® sedan, can be powered by the gas engine only, the electric motor only, or both at the same time. Honda's two-seat Insight and Honda Civic® sedan incorporate a series-type hybrid, where the electric motor assists the internal combustion engine when needed, such as during acceleration or times of heavy load, but doesn't power the car on its own.

Figure 13:
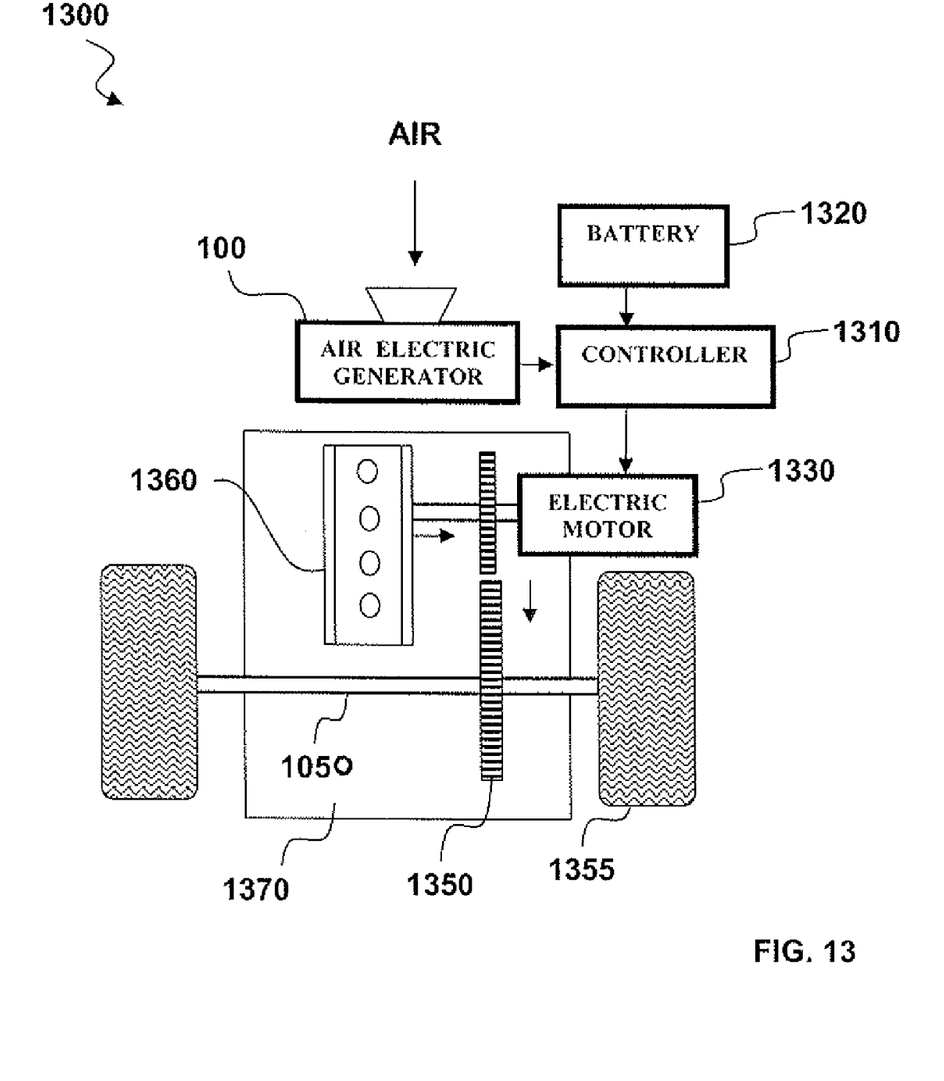
FIG. 13 illustrates modules commonly found within a hybrid electric vehicle together with an air electric generation module.

Referring to FIG. 13, system diagram illustrates a hybrid electric vehicle components 1300 that include a internal combustion engine 1360 that can power both the drive wheels 1355 and a generator (not shown). The present invention can be incorporated into a HEV to assist in further electrical power generation. An air electric generator 100 can be incorporated into the hybrid vehicle and can be processed through a controller 1310 to charge batteries 1320, and can also provide power directly to the electric motor 1330. The electric motor 1330 in HEV vehicles, as with the internal combustion engine 1360, provide mechanical power to a gearing system 1350 that provides mechanical power directly to a shaft 1050 that rotates wheels 1355.

The wind power generator design of the present system lends itself to more efficient power generation for Hybrid or all electric vehicles by incorporating the design of the cowling 105 (a tube with an aerodynamic fairing around it) or conical air intake to help direct air flow encountered at the front of a moving vehicle during the vehicle's forward movement into the electric power generating chamber. The cowling inlet 105 when incorporated into a vehicle is design to draw in as much wind coming toward it as possible to cause favorable power generation by the system as a result of fixed helix 120 and fan blade assembly 130 interaction with air flow through the tubular 110 at the front grill or in the fairing of a hybrid or all electric vehicle. A moving vehicle would therefore be generating electricity while it is in motion; the electricity charging or storing power with the vehicle's batteries.

Other vehicles that can incorporate the electric power generating system of the invention include water vessels, trains, and aircraft. All vehicles forms encounter force caused by air at the front of the vehicle regardless of aerodynamic design. This force is typically viewed as drag on a vehicle's efficiency, but it can now be utilized as a source of energy for the purpose of generating electricity for concurrent or future use by the vehicle. This unique design of the present system can also lends itself well to incorporating capacitors for storing power while the vehicle is not in motion for the purpose of initiation spin on the electric generator. Basically, the initial power from the capacitor can get a generator started into rotational motion where magnetic force in static rest make it difficult for the generator to begin spinning until force from air flow can maintain spin over the generator. This may not be necessary for all generator and fin configurations.

Figure 14:
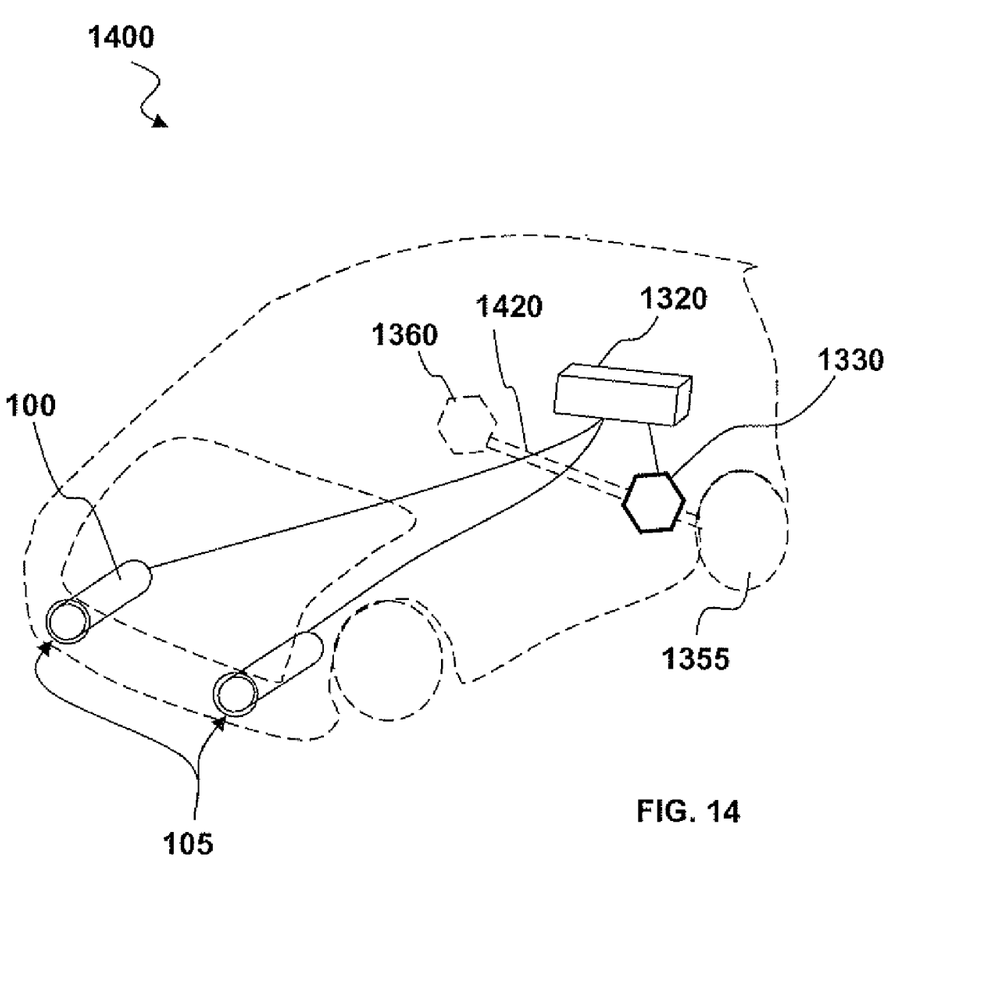
FIG. 14 illustrates where, within a motor vehicle, system HEV components and air electric generation components would be deployed.

Referring to FIG. 14, illustrated is a picture of a motor vehicle to show where within the motor vehicle the air electric generation components can be located. The wind driven electrical power generating system 100 can be placed in the front of a vehicle, which is the part of the vehicle most likely to be driven forward into air pressure (e.g., like wind). A cowling 105, scaled to fit within the front of a vehicle can capture air as the vehicle moves forward and enable the air to move through the wind driven electrical power generating system 100. Electrical power generated by the wind driven electrical power generating system 100 can be electrical routed by wiring 1420 to a controller/batteries 1320 to assist in recharging of the batteries during vehicle use. Power from the controller/batteries 1320 is used by an electric motor 1330 to assist in proving mechanical rotational power to wheels 1355. The electric motor when used as part of a hybrid system can assist with other mechanical means such as an internal combustion engine 1360.

An old idea made possible because of today's technology is a hybrid setup called "belt alternator starter" system. It is simple in its design and also shuts the engine off at stops, then restarts with a push on the gas pedal. Unlike all of the other hybrid configurations, this does not have an electric motor on board. Honda's Civic® Hybrid sedan incorporates a series hybrid system; the electric motor assists the internal combustion engine when needed, for example during acceleration or times of heavy load, but doesn't power the car on its own. By contrast, in a series hybrid, the gasoline engine turns a generator, and the generator can either charge the batteries or power an electric motor that drives the transmission. Thus, the internal combustion engine never directly powers the vehicle. The structure of a hybrid car harnesses two sources of power to increase efficiency and provide performance.

The transmission on a hybrid car performs the same basic function as the transmission on a conventional car. Some hybrids, like the Honda Insight®, have conventional transmissions. Others, like the Toyota Prius®, have radically different ones.

The wind driven electric power generator of the present invention can be compact and easy to mount. The present system can be designed for harsh climates, built simply and ruggedly to quietly last. The system design can incorporate a cowling as an air intake and internal helical vanes to help direct the amount of air flow into the chamber to capture more wind and produce more energy, especially in low wind speeds which lends itself to more efficient power generation utilizing renewable energy. Various system configurations can be achieved given the present teaching by incorporating the most advanced technology in the industry and providing highly reliable power systems that can integrate state-of-the-art off the shelf micro-processor regulator for more accurate charging, more power, lower startup speed and quieter operation, and small wind turbine generators. For example, a light weight system can be manufactured using an Aluminum cast body and carbon matrix rotor blades. A system can be designed to start up a low wind speed (e.g., starting at 7 mph), run efficiently (e.g., 100 watts at 18 mph, 200 watts at 22 mph, 400 watts at 28), and be resilient to harsh conditions (e.g., designed to govern in high winds and auto-brake one demand or automatically).

Generated electrical power can be routed via electrical connections from the generator for direct storage in and then for later from batteries. Conditioning can be provided to generated power if necessary using conditioning circuits known in the art (e.g., filtering circuits). The size of the present system is scalable to meet delivery requirements.

Temperature of the system may need to be controlled depending on the climate it operates within. For example, during winter or in colder climates, an internal thermostatically controlled heating device may be incorporated into the system to prevent freezing of the unit's moving parts.

The enclosure tube (i.e., the general housing) can be designed such that its diameter can be calculated to fit the desired electrical output and must be matched with each integral part both internal as well as external. This calculation can also include allowance for creation of a venturi effect between and/or over the generator and its mounting assembly to maximize the affect of the available wind. The enclosure can be made of a tough light weight metal or a composite that will be able to withstand harsh environments while meeting the highest of standards.

Additional features of the system are that the generator can be placed substantially within the housing, which can protect it from external elements, and the fan can be connected to the generator at the end of the system opposite incoming wind with respect to the generator an tubing. A cone can be located at the front of the generator facing incoming air/wind to cause the wind/air to flow directly onto the blades and not encounter a flat edge typically associated with the back of a generator. Pressure caused between the tubing and the cone/generator can be forced onto the generator fan blade assembly and outward where it exits to the rear of the unit. The back of the generator can be fitted with a cone as well to further direct the air on to the cupped fan blade. The rear funnel also plays a critical part as the blade can be placed in such a way to provide additional thrust to the fan blade by the clearance of the blade and funnel.

An electronic starting circuit can be provided in order to facilitate initial starting of the generator from periods when the generator is idle (e.g., no rotation due to lack of wind). The electronic starting system can provide an initial release of electrical energy to the windings in the generator to thereby reduce the amount of wind required to spin-up or start rotation of the generator. For example, a capacitor circuit has been coupled into electrical systems such as heating and air conditioning units to provide initial startup. Generators are known to have some resistance under a load. With a large initial starting charge drawn from the circuit, the generator can be spun up to a speed where at the wind can take over and continue rotation of the generator at minimum speeds via the fan blades.

Mounting of the unit to poles, rooftops, beams and other fixed hardware can be facilitated with bearing and mounts that can withstand extreme fluctuations and high stress.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A wind driven electrical power generating system, comprising:
    a tubular housing having an inner surface, outer surface, a first end and a second end, the first end including a cowling adapted to capture wind and directing it into an air passage tube, and the second end forming an exhaust for air to exit the housing;
    an electrical generator mounted near the second end of the tubular housing and the exhaust, the electrical generator further connected to a fan including fan blades;
    at least one fixed helical vane formed on the inner surfaces of the tubular housing in a spiral;
    wherein the cowling captures wind and directs it into a tubular housing, the at least one fixed helical vane further direct the captured wind into a spiraled air flow and focus the wind directly onto the fan blades located near an exhaust of the system causing the generator to generate electrical energy.

2. The wind driven electrical power generating system of claim 1, further comprising a generator cone mounted at a front surface of at least one of the generator and fan facing air passing through the tubular housing, wherein as air passes over the generator cone it is compressed between the generator cone and housing resulting in increased pressure and velocity of the air, thereby increasing rotational speed of the generator blades and generator as compressed air passes through the blades and exits the exhaust.

3. The wind driven electrical power generating system of claim 1, further comprising a fin mounted to the outer surface of the housing near the second end of the housing, the fin adapted for orienting the first end of the housing and the cowling into wind.

4. The wind driven electrical power generating system of claim 1, further comprising a conical flange formed at the second end of the unit, said conical flange adapted to protect the fan blades and enables air to escape from the unit without interruption from exterior wind moving along the outer surface of the housing.

5. The wind driven electrical power generating system of claim 3, further comprising a pole whereon the housing is rotatably mounted above ground.

6. The wind driven electrical power generating system of claim 3, further comprising a mounting system including sealed contact disc system integrated with a sealed bearing system and adapted to rotatably mount the housing to a pole and facilitate an electrical connection between wires associated with the generator and external power system modules including at least one of batteries, converters, controllers, and adapted to prevent wire tangling.

7. The wind driven electrical power generating system of claim 3, further comprising a mounting system including sealed contact disc system integrated with a sealed bearing system and adapted to rotatably mount the housing to a pole and facilitate an electrical connection between wires associated with the generator and external power system modules including at least one of batteries, converters, conditioners controllers, and said mounting system is further adapted to prevent wire tangling.

8. The wind driven electrical power generating system of claim 1, wherein the system can be integrated near the front of a moving vehicle to capture air with the cowling as the vehicle moves forward and enable air to pass through the housing and spin the fan blades thereby generating electrical power from air for a load in the moving vehicle.

9. The wind driven electrical power generating system of claim 3, wherein said fan further comprises cupped fan blades adapted to capture air pressure on the cupped fan blades and enhance rotation of the generator.

10. The wind driven electrical power generating system of claim 3, further comprising a clutching mechanism and/or mechanical breakaway can be provided to accommodate conditions where the wind speed exceeds rotational capabilities of the generator and/or power output requirements/thresholds. Clutching can be provided in the form of a fan blade assembly designed with materials that can flex above threshold rotational speeds (RPMs) in order to prevent operation of the generator above damage causing thresholds, design parameters and generator capacity limits.

11. The wind driven electrical power generating system of claim 3, further comprising an electronic starting circuit adapted to facilitate initial starting of the generator from periods when the generator is idle, said electronic starting system further adapted to provide an initial release of electrical energy to the windings in the generator and thereby reduce the amount of wind required to start rotation of the generator.

12. A wind driven electrical power generating system, comprising:
    a tubular housing having an inner surface, outer surface, a first end and a second end, the first end including a cowling adapted to capture wind and directing it into an air passage tube, and the second end forming an exhaust for air to exit the housing;
    at least one fixed helical vane formed on the inner surfaces of the tubular housing in a spiral;
    an electrical generator mounted near the second end of the tubular housing and the exhaust, the electrical generator further connected to a fan including fan blades;
    a generator cone mounted at a front surface of at least one of the electrical generator and fan facing air passing through the tubular housing;
    wherein the cowling captures wind and directs it into a tubular housing, the at least one fixed helical vane further direct the captured wind into a spiraled air flow that passes over the generator cone as is compression between the generator cone and housing resulting in increased pressure and velocity of the spiraled air flow thereby increasing rotational speed of the generator blades and generator as compressed air passes through the blades and exits the exhaust.

13. The wind driven electrical power generating system of claim 12, further comprising:
    a fin mounted to the outer surface of the housing near the second end of the housing, the fin adapted for orienting the first end of the housing and the cowling into wind.

14. The wind driven electrical power generating system of claim 13, further comprising:

a conical flange formed at the second end of the unit, said conical flange adapted to protect the fan blades and enables air to escape from the unit without interruption from exterior wind moving along the outer surface of the housing.

15. The wind driven electrical power generating system of claim 12, further comprising:
a conical flange formed at the second end of the unit, said conical flange adapted to protect the fan blades and enables air to escape from the unit without interruption from exterior wind moving along the outer surface of the housing.

16. The wind driven electrical power generating system of claim 15, further comprising:
a fin mounted to the outer surface of the housing near the second end of the housing, the fin adapted for orienting the first end of the housing and the cowling into wind.

17. The wind driven electrical power generating system of claim 13, further comprising a mounting system including sealed contact disc system integrated with a sealed bearing system assembly and adapted to rotatably mount the housing to a pole and facilitate an electrical connection between wires associated with the generator and external power system modules including at least one of batteries, converters, conditioners controllers, and said mounting system is further adapted to prevent wire tangling.

18. The wind driven electrical power generating system of claim 15, further comprising a mounting system including sealed contactor disc system integrated with a sealed bearing system assembly and adapted to rotatably mount the housing to a pole and facilitate an electrical connection between wires associated with the generator and external power system modules including at least one of batteries, converters, conditioners controllers, and said mounting system is further adapted to prevent wire tangling.

19. The wind driven electrical power generating system of claim 12, wherein the system can be integrated near the front of a moving vehicle to capture air with the cowling as the vehicle moves forward and enable air to pass through the housing and helical vanes, between the generator cone and inner housing surface onto the fan blades thereby spinning the electrical generator and generating electrical power from air for a load in the moving vehicle.

20. A wind driven electrical power generating system, comprising:
a tubular housing having an inner surface, outer surface, a first end and a second end, the first end including a cowling adapted to capture wind and directing it into an air passage tube, and the second end forming an exhaust for air to exit the housing;
at least one fixed helical vane formed on the inner surfaces of the tubular housing in a spiral;
an electrical generator mounted near the second end of the tubular housing and the exhaust, the electrical generator further connected to a fan including fan blades;
a generator cone mounted at a front surface of at least one of the electrical generator and fan facing air passing through the tubular housing;
a conical flange formed at the second end of the unit, said conical flange adapted to protect the fan blades and enables air to escape from the unit without interruption from exterior wind moving along the outer surface of the housing;
a fin mounted to the outer surface of the housing near the second end of the housing, the fin adapted for orienting the first end of the housing and the cowling into wind;
wherein the cowling captures wind and directs it into a tubular housing, the at least one fixed helical vane further direct the captured wind into a spiraled air flow that passes over the generator cone and is compressed between the generator cone and housing resulting in increased pressure and velocity of the spiraled air flow thereby increasing rotational speed of the generator blades and generator as compressed air passes through the blades and exits the exhaust.

* * * * *